United States Patent
Prabhu et al.

(10) Patent No.: US 12,399,084 B2
(45) Date of Patent: Aug. 26, 2025

(54) DIGITALLY CONTROLLED NITROGEN OXIDE (NOx) SENSOR

(71) Applicant: HONEYWELL INTERNATIONAL INC., Charlotte, NC (US)

(72) Inventors: Prashant Prabhu, Bangalore (IN); Raghunanda Basavarajappa, Bangalore (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 345 days.

(21) Appl. No.: 18/061,566

(22) Filed: Dec. 5, 2022

(65) Prior Publication Data

US 2024/0133769 A1 Apr. 25, 2024
US 2024/0230469 A9 Jul. 11, 2024

(30) Foreign Application Priority Data

Oct. 19, 2022 (IN) .............................. 202211059785

(51) Int. Cl.
G01M 15/10 (2006.01)
G05D 23/20 (2006.01)
H05B 1/02 (2006.01)

(52) U.S. Cl.
CPC ...... *G01M 15/102* (2013.01); *G05D 23/2037* (2013.01); *H05B 1/0236* (2013.01)

(58) Field of Classification Search
CPC ............ G01M 15/102; G05D 23/2037; G05D 23/1917; H05B 1/0236
See application file for complete search history.

(56) References Cited

U.S. PATENT DOCUMENTS

| 7,114,325 | B2 * | 10/2006 | Surnilla ................ F01N 3/0871 |
| | | | 73/23.32 |
| 8,140,211 | B2 * | 3/2012 | Grimes .................... B60K 6/48 |
| | | | 701/36 |
| 8,359,831 | B2 * | 1/2013 | Chmielewski ........ F01N 3/2066 |
| | | | 60/286 |
| 10,539,544 | B2 * | 1/2020 | Bessman ............... F02D 41/146 |
| 10,868,867 | B2 * | 12/2020 | Binder .................... H04L 67/12 |

(Continued)

FOREIGN PATENT DOCUMENTS

| CN | 110735699 A | 1/2020 |
| CN | 214252181 U | 9/2021 |
| EP | 2354784 A1 | 8/2011 |

*Primary Examiner* — Freddie Kirkland, III
(74) *Attorney, Agent, or Firm* — Ingrassia, Fisher & Lorenz LLP

(57) ABSTRACT

A nitrogen-oxide (NOx) sensor control system includes a NOx sensor analog front-end, a temperature sensor analog front-end, and a processing system. The NOx sensor analog front-end is adapted to receive analog NOx sensor signals from a NOx sensor and is configured to convert the analog NOx sensor signals to digital NOx sensor signals. The temperature sensor analog front-end is adapted to receive analog temperature sensor signals from a temperature sensor and is configured to convert the analog temperature sensor signals to digital temperature sensor signals. The processing system is coupled to receive the digital NOx sensor signals and the digital temperature sensor signals and is configured, in response thereto, to: supply the digital NOx sensor signals to an external system, and control a flow of current to a heater element in the NOx sensor.

12 Claims, 3 Drawing Sheets

(56) References Cited

U.S. PATENT DOCUMENTS

| | | | |
|---|---|---|---|
| 2002/0162743 A1 | 11/2002 | Inagaki | |
| 2005/0192727 A1* | 9/2005 | Shostak | G07C 5/0808 |
| | | | 701/1 |
| 2006/0016174 A1 | 1/2006 | Surnilla et al. | |
| 2009/0187306 A1* | 7/2009 | Grimes | B60K 6/365 |
| | | | 701/36 |
| 2012/0192623 A1 | 8/2012 | Adami et al. | |
| 2013/0104528 A1* | 5/2013 | Chmielewski | F04B 35/04 |
| | | | 137/334 |
| 2016/0169137 A1 | 6/2016 | Higuchi et al. | |
| 2017/0131251 A1 | 5/2017 | Bessman et al. | |
| 2019/0376425 A1 | 12/2019 | Kato et al. | |
| 2020/0224600 A1 | 7/2020 | Murayama et al. | |

* cited by examiner

DIGITALLY CONTROLLED NITROGEN OXIDE (NOx) SENSOR

CROSS-REFERENCE TO RELATED APPLICATION

This application claims priority to India Provisional Patent Application No. 202211059785, filed Oct. 19, 2022, the entire content of which is incorporated by reference herein.

TECHNICAL FIELD

The present invention generally relates to nitrogen oxide (NOx) sensors, and more particularly relates to a fully digital solution for excitation, control, and output quantization of a NOx sensor.

BACKGROUND

Nitrogen Oxide (NOx) sensors are primarily used to detect NOx levels in the exhaust systems of vehicles equipped with an internal combustion engine; most notably, diesel engines. Typically, such vehicles include an engine control module (ECM) that continuously receives, among other things, the sensor signals supplied from the NOx sensors to ensure acceptable emissions levels in the vehicle exhaust.

As is generally known, most NOx sensors need to be heated to a relatively high temperature (e.g., 600-1000° C.) to properly operate. Thus, most NOx sensors include a heater element that is supplied with current from a heater control circuit to preemptively heat the NOx sensor to the correct temperature. As may be appreciated, this requires that a relatively high magnitude current flow be supplied to the heater element, at least for an initial period of time, until the NOx sensor reaches the operating temperature. Thereafter, the flow of current to the heater element is controlled, as needed, to maintain the NOx sensor at the operating temperature.

Presently known NOx sensors rely heavily on analog circuitry to process the sensor signals and control the current flow to the heater element. These presently known techniques, can take anywhere from 20 to 60 seconds to heat the sensor up to the proper operating temperature, prolonging the time it takes for the ECM to enter closed-loop fuel control. The presently known techniques also rely on pulsed current, which can cause EMI/EMC issues, and/or relatively complex hardware that can exhibit feedback loop instability.

Hence, there is a need to provide a practical, reliable, fast, and cost-effective means of processing NOx sensor signals and supplying current flow to NOx sensor heater elements that does not cause EMI/EMC issue and can increase temperature of the NOx sensor to the operating temperature in a relatively short time period (e.g., 5-10 seconds). The present disclosure addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a nitrogen-oxide (NOx) sensor control system includes a NOx sensor analog front-end, a temperature sensor analog front-end, and a processing system. The NOx sensor analog front-end is adapted to receive analog NOx sensor signals from a NOx sensor and is configured to convert the analog NOx sensor signals to digital NOx sensor signals. The temperature sensor analog front-end is adapted to receive analog temperature sensor signals from a temperature sensor and is configured to convert the analog temperature sensor signals to digital temperature sensor signals. The processing system is coupled to receive the digital NOx sensor signals and the digital temperature sensor signals and is configured, in response thereto, to: supply the digital NOx sensor signals to an external system, and control a flow of current to a heater element in the NOx sensor.

In another embodiment, a nitrogen-oxide (NOx) sensor system includes a NOx sensor assembly and a NOx sensor control system. The NOx sensor assembly includes a NOx sensor, a heater element, and a temperature sensor. The NOx sensor is configured to sense NOx gases and supply analog NOx sensor signals indicative of the sensed NOx gases. The heater element is coupled to at least selectively receive a flow of current. The temperature sensor is configured to sense a temperature of the NOx sensor and supply analog temperature sensor signals indicative of the sensed temperature. The NOx sensor control system is coupled to the NOx sensor and includes a NOx sensor analog front-end, a temperature sensor analog front-end, and a processing system. The NOx sensor analog front-end is adapted to receive the analog NOx sensor signals from the NOx sensor and is configured to convert the analog NOx sensor signals to digital NOx sensor signals. The temperature sensor analog front-end is adapted to receive the analog temperature sensor signals from the temperature sensor and is configured to convert the analog temperature sensor signals to digital temperature sensor signals. The processing system is coupled to receive the digital NOx sensor signals and the digital temperature sensor signals and is configured, in response thereto, to: supply the digital NOx sensor signals to an external system, and control the flow of current to the heater element.

In yet another embodiment, a vehicle includes a vehicle body, an internal combustion engine, a NOx sensor assembly, and a NOx sensor control system. The internal combustion system is disposed within the vehicle body and is configured, when operating, to generate and emit exhaust gases. The NOx sensor assembly is disposed within the vehicle and includes a NOx sensor, a heater element, and a temperature sensor. The NOx sensor is configured to sense NOx gases and supply analog NOx sensor signals indicative of the sensed NOx gases. The heater element is coupled to at least selectively receive a flow of current. The temperature sensor is configured to sense a temperature of the NOx sensor and supply analog temperature sensor signals indicative of the sensed temperature. The NOx sensor control system is disposed within the vehicle body and is coupled to the NOx sensor. The NOx sensor control system includes a NOx sensor analog front-end, a temperature sensor analog front-end, and a processing system. The NOx sensor analog front-end is adapted to receive the analog NOx sensor signals from the NOx sensor and is configured to convert the analog NOx sensor signals to digital NOx sensor signals. The temperature sensor analog front-end is adapted to receive the analog temperature sensor signals from the temperature sensor and is configured to convert the analog temperature sensor signals to digital temperature sensor signals. The processing system is coupled to receive the digital NOx sensor signals and the digital temperature sensor signals and is configured, in response thereto, to: supply the digital NOx sensor signals to an external system, and control the flow of current to the heater element.

Furthermore, other desirable features and characteristics of the NOx sensor control system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
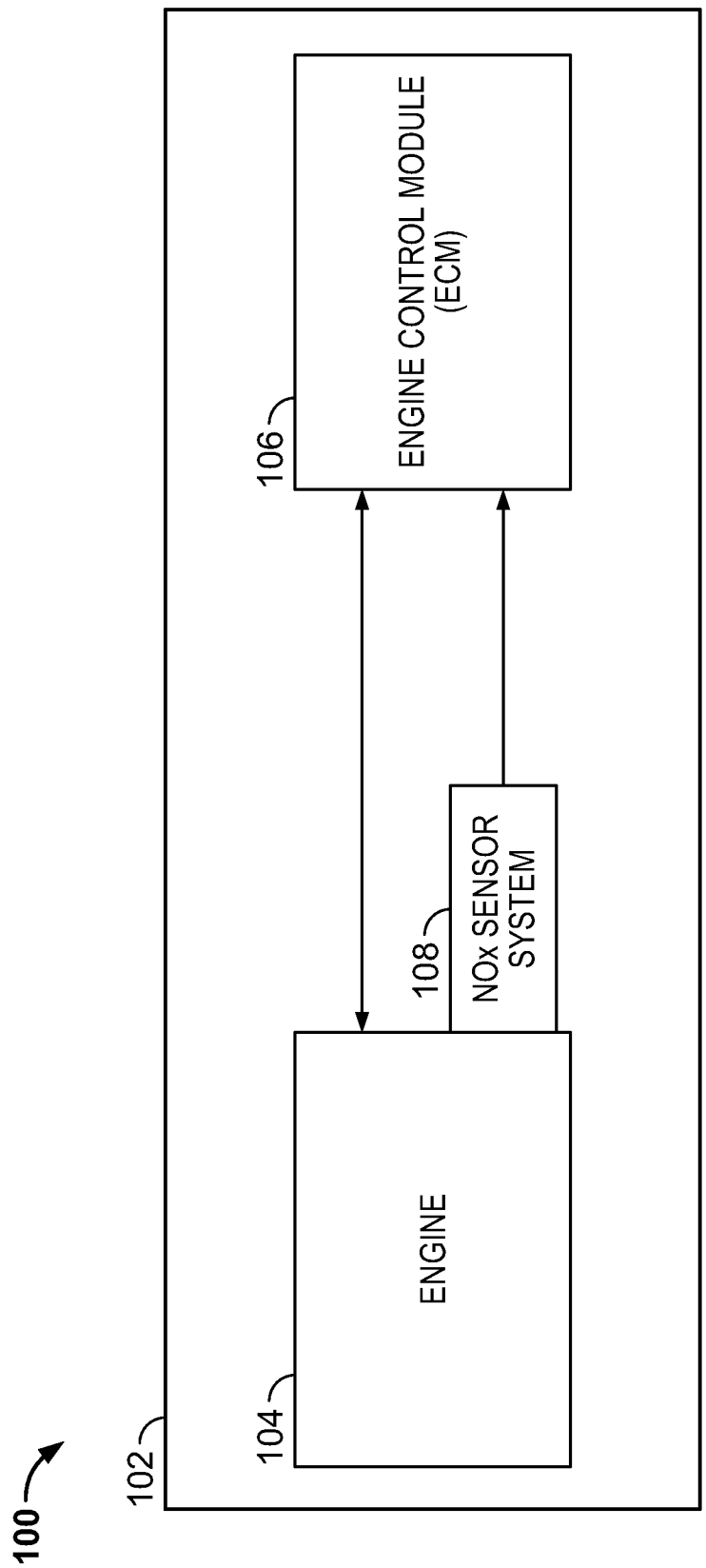
FIG. 1 depicts a functional block diagram of one embodiment of a vehicle.

Referring to FIG. 1, a functional block diagram of one embodiment of a vehicle 100 is depicted. The vehicle includes a vehicle body 102, an internal combustion engine 104, an engine control module 106 (ECM), and a NOx sensor system 108. The internal combustion engine 104 is disposed within the vehicle body 102 and, when operating, will, among various other functions, generate and emit exhaust gases. It will be appreciated that the internal combustion engine 104 may be any one of numerous types of spark ignition gasoline engines or compression ignition diesel engines. In one particular embodiment, however, it is a compression ignition diesel engine.

Figure 2:
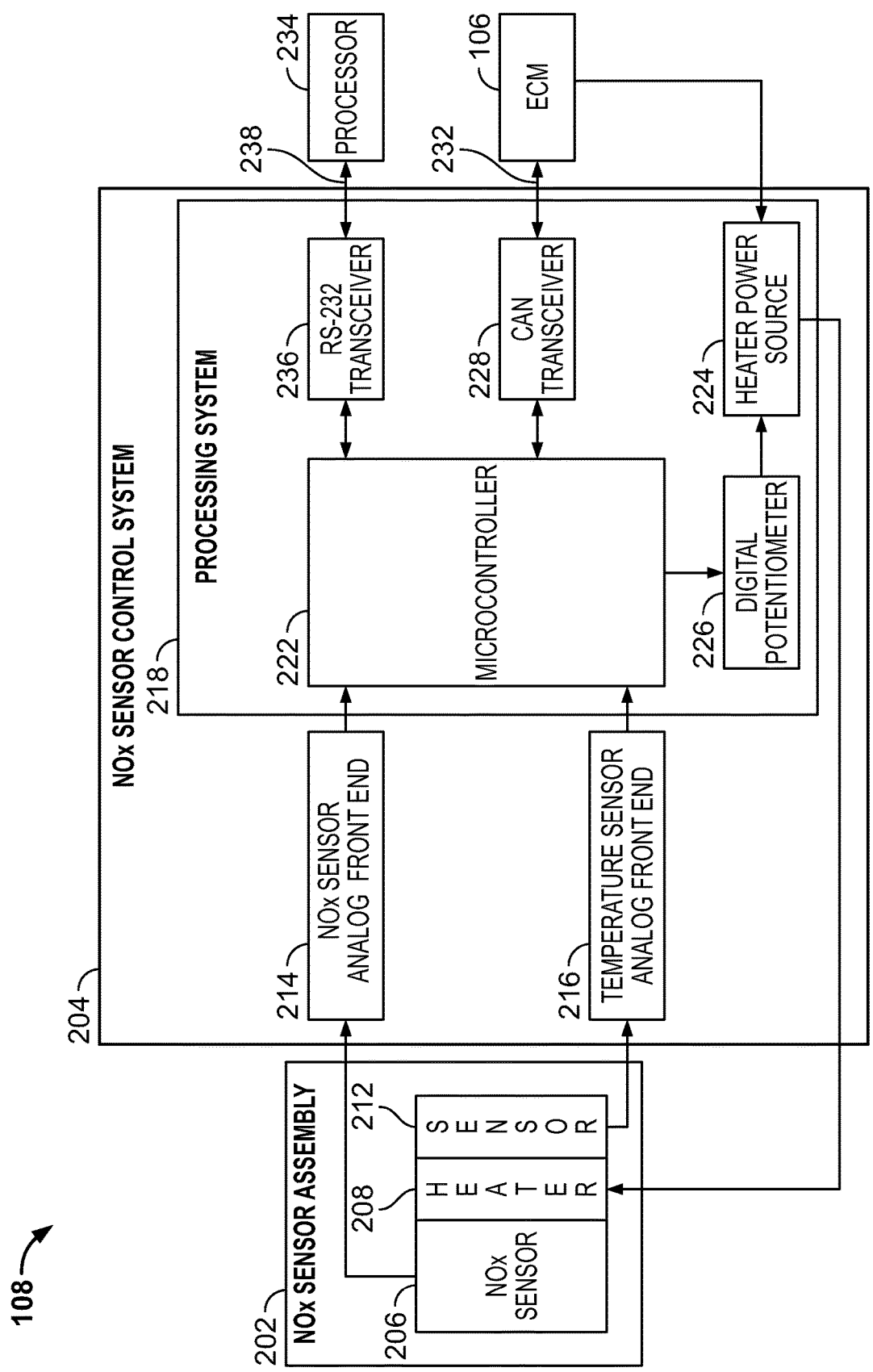
FIG. 2 depicts a functional block diagram of one example embodiment of a NOx sensor system that may be implemented FIG. 3 graphically depicts abrupt changes in heater voltage and current from low to high and back to low.

The ECM 106 receives various sensor signals associated with the engine 104 and, in response to these sensor signals, controls various portions of the engine 104 to ensure optimal engine performance. Although the number and type of sensor signals supplied to the ECM 106 may vary, in the depicted embodiment at least one of the sensor signals includes digital NOx sensor signals that are supplied to the ECM 106 from the NOx sensor system 108. A functional block diagram of one example embodiment of the NOx sensor system 108 is depicted in FIG. 2, and with reference thereto, will now be described.

The NOx sensor system 108 includes at least one NOx sensor assembly 202 and a NOx sensor control system 204. Before proceeding further, it should be noted that the NOx sensor system 108 could, and probably would, include more than one NOx sensor assembly 202. However, for ease of description and illustration, only a single NOx sensor assembly 202 is depicted and described herein.

Returning to the description, it is seen that the NOx sensor assembly 202, which is disposed within the vehicle body 102, includes a NOx sensor 206, a heater element 208, and a temperature sensor 212. The NOx sensor 206 is disposed to receive at least a portion of the exhaust gases from the engine 104. The NOx sensor 206 is configured, as is conventionally known, to sense NOx gases in the exhaust gases and supply analog NOx sensor signals indicative of the sensed NOx gases.

The heater element 208 is coupled to at least selectively receive a flow of current and, in response to the flow of current, to generate heat. The heater element 208 may be variously configured and implemented, but in the depicted embodiment the heater element 208 is implemented using a resistive heater coil.

The temperature sensor 212 is disposed adjacent to, and is configured to sense the temperature of, the NOx sensor 206 and to supply analog temperature sensor signals indicative of the sensed temperature. The temperature sensor 212 may be implemented using any one of numerous types of temperature sensors. In one particular embodiment, however, it is implanted using a resistance temperature detector (RTD), and more specifically a 3-wire RTD.

The NOx sensor control system 204 is also disposed within the vehicle body and is coupled to the NOx sensor assembly 202. The NOx sensor control system 204 includes a NOx sensor analog front-end 214, a temperature sensor analog front-end 216, and a processing system 218. The NOx sensor analog front-end 214 is coupled to receive the analog NOx sensor signals from the NOx sensor 206 and is configured to convert the analog NOx sensor signals to digital NOx sensor signals. It will be appreciated that the NOx sensor analog front-end 214 may be variously implemented using any one of numerous suitable analog-to-digital circuitry configurations. In one non-limiting example embodiment, in which the NOx sensor control system 204 is configured to interface with multiple NOx sensor assemblies 202, the NOx sensor analog front end 214 is implemented using an LMP9100 integrated circuit for each sensor assembly 202 and a multi-channel, multiplexed, analog-to-digital converter, such as the ultralow noise, 24-bit, Sigma-Delta AD7193BRUZ analog-to-digital converter.

The temperature sensor analog front-end 216 is coupled to receive the analog temperature sensor signals from the temperature sensor 212 and is configured to convert the analog temperature sensor signals to digital temperature sensor signals. It will additionally be appreciated that the temperature sensor analog front-end 216 may be variously implemented using any one of numerous suitable analog-to-digital circuitry configurations. In one non-limiting example embodiment, in which the NOx sensor control system 204 is configured to interface with multiple NOx sensor assemblies 202, the temperature sensor analog front end 216 is implemented using a 24-bit ADS1220IPWR analog-to-digital converter.

The processing system 218 is coupled to receive the digital NOx sensor signals and the digital temperature sensor signals and is configured, in response to these digital signals, to supply the digital NOx sensor signals to the ECM 106, and to control the flow of current to the heater element 208. To this end, and as FIG. 2 further depicts, the processing system 218, at least in the depicted embodiment, is implemented using at least a microcontroller 222, a heater power source 224, and a digital potentiometer 226. The microcontroller 222 receives and processes the digital NOx sensor signals and the digital temperature sensor signals and supplies the digital NOx sensor signals to the ECM 106. The microcontroller 222 is additionally configured, in response to the digital NOx sensor signals and the digital temperature sensor signals, to supply a resistance command to the digital potentiometer 226, whereby the flow of current to the heater element 208 is controlled. It will be appreciated that the microcontroller 222 may be implemented using any one of numerous known microcontrollers now known or developed in the future. In one non-limiting example embodiment, it is implemented using the NXP Kinetis K26 microcontroller, which can support up to six NOx sensors.

The heater power source 224 is operable to supply the flow of current to the heater element 208. It will be appreciated that the heater power source 224 may be variously configured and implemented. In one non-limiting example embodiment, the heater power source 224 is implemented using a suitable EMI filter and a TPS54567QDPRT DC-DC converter. It will be appreciated, however, that the particular DC-DC converter topology may vary. That is, it may be implemented using buck, boost, or buck-boost topologies.

The digital potentiometer 226 is coupled to the heater power source 224 and is also coupled to receive the resistance command from the microcontroller 222. The digital potentiometer 226 is configured to control the flow of current from the heater power source 224 to the heater element 208 based on the resistance command. It will be appreciated that the digital potentiometer 226 may be implemented using any one of numerous known digital potentiometers now known or developed in the future. In one non-limiting example embodiment, it is implemented using an I2C interfaced AD5274BRMZ digital potentiometer.

It was previously noted that the NOx sensor system 108 supplies the digital NOx sensor signals to the ECM 106. Preferably, this is done via the controller area network (CAN) protocol. Thus, as FIG. 2 also depicts, the NOx sensor system 108 may also include a CAN transceiver 228, which is coupled to receive the digital NOx sensor signals from the processing system 218 and to supply the digital NOx signals to the ECM 106 via a CAN bus 232.

The sensor system 108 may also supply the digital NOx sensor signals to one or more processors 234. Thus, as FIG. 2 additionally depicts, the NOx sensor system 108 may also include an RS-232 transceiver 236, which is coupled to receive the digital NOx sensor signals from the processing system 218 and to supply the digital NOx signals to the one or more processors 234 via an RS-232 compatible bus 238.

The processing system 218 provides a practical, reliable, fast, and cost-effective means of processing the NOx sensor signals and supplying current flow to the heater element 208 in a manner that does not cause EMI/EMC issues and can increase the temperature of the NOx sensor 206 to the operating temperature in a relatively short time period (e.g., 1-5 seconds). To do so, the microcontroller 222 supplies a suitable resistance command to the digital potentiometer 226, which in turn controls the output current supplied from the heater power source 224 to the heater element 208. In the depicted embodiment, the output current is inversely proportional to the resistance value of the digital potentiometer. So, to supply relatively high current to the heater element 208, microcontroller 222 commands the digital potentiometer 226 to a relatively low resistance value. The digital potentiometer 226 is commanded to this low resistance value until the temperature of the NOx sensor 206 attains the desired operating temperature, as sensed by the temperature sensor 212.

Figure 3:
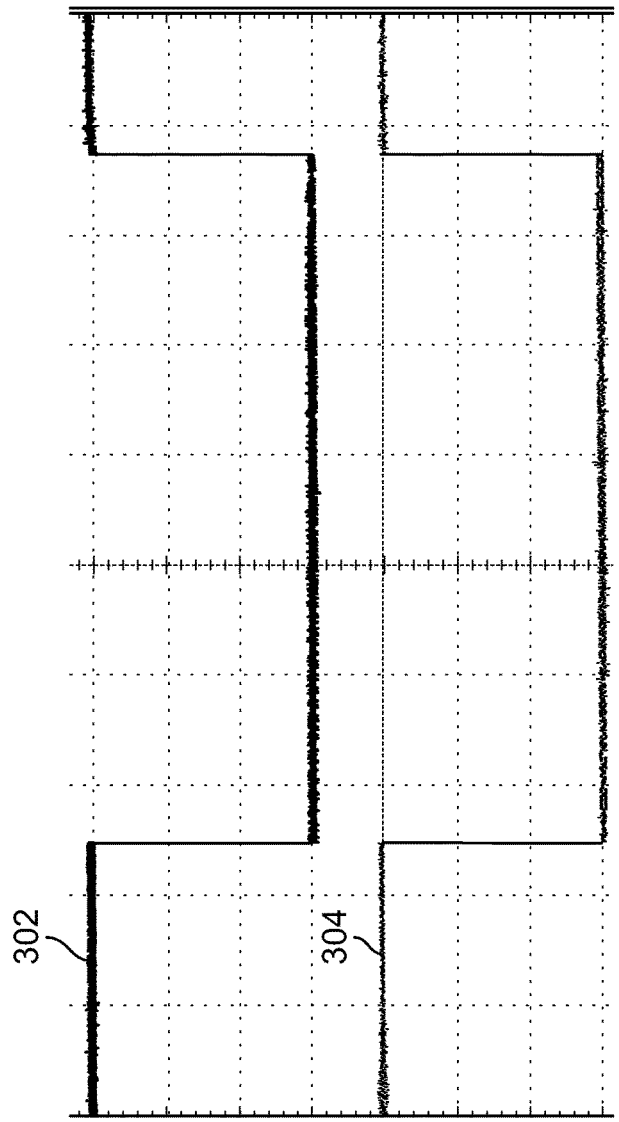
Figure 4:
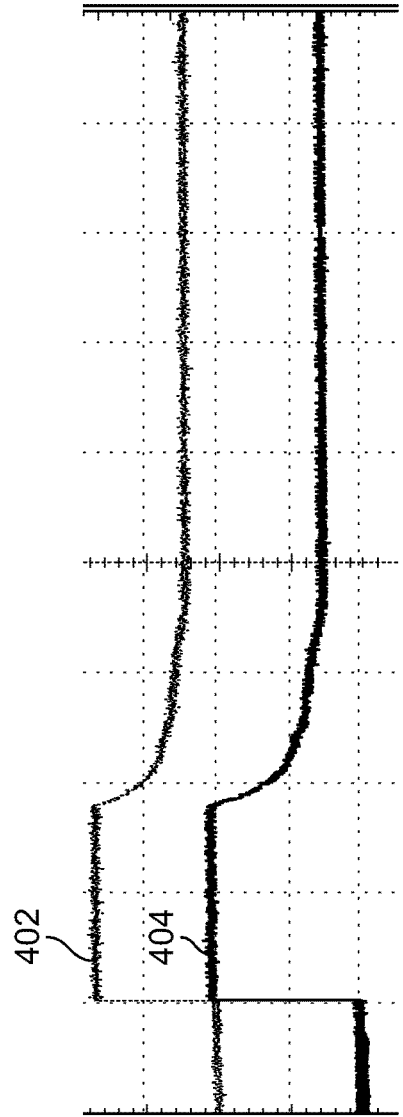
FIG. 4 graphically depicts abrupt changes in heater voltage and current from low to high and then smooth transitions back to low.

It will be appreciated that the microcontroller 222 can command the digital potentiometer 226 to a relatively low resistance value and then to a relatively high resistance value in a relatively rapid manner, and thus cause, as shown in FIG. 3, relatively rapid changes (e.g., stepwise changes) in the output voltage 302 and current 304 of the heater power source 224. Preferably, however, the microcontroller 222 is configured to command the digital potentiometer 226 from the relatively low resistance to the relatively high resistance in smaller increments, equal to the resolution of the digital potentiometer 226, so that, as shown in FIG. 4, the output voltage 402 and current 404 of the heater power source 224 smoothly decrease from relatively high values to relatively low values and thereby avoid any stability issues. This also reduces the di/dt of current and hence avoids EMI issues.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A nitrogen-oxide (NOx) sensor control system, comprising:
    a NOx sensor analog front-end adapted to receive analog NOx sensor signals from a NOx sensor and configured to convert the analog NOx sensor signals to digital NOx sensor signals;
    a temperature sensor analog front-end adapted to receive analog temperature sensor signals from a temperature sensor and configured to convert the analog temperature sensor signals to digital temperature sensor signals; and
    a processing system, the processing system comprising:
        a microcontroller coupled to receive the digital NOx sensor signals and the digital temperature sensor signals and configured, in response thereto, to (i) supply the digital NOx sensor signals to an external system and (ii) supply a resistance command,
        a heater power source operable to supply a flow of current to a heater element; and
        a digital potentiometer coupled to the heater power source and further coupled to receive the resistance command from the microcontroller, the digital potentiometer configured to control the flow of current from the heater power source to the heater element based on the resistance command.

2. The sensor control system of claim 1, wherein the NOx sensor analog front-end comprises a multi-channel, multiplexed, analog-to-digital converter.

3. The sensor control system of claim 1, further comprising an RS-232 transceiver coupled to receive the digital NOx sensor signals from the processing system.

4. The sensor control system of claim 1, further comprising a controller area network (CAN) transceiver coupled to receive the digital NOx sensor signals from the processing system.

5. A nitrogen-oxide (NOx) sensor system, comprising:
a NOx sensor assembly including a NOx sensor, a heater element, and a temperature sensor, the NOx sensor configured to sense NOx gases and supply analog NOx sensor signals indicative of the sensed NOx gases, the heater element coupled to at least selectively receive a flow of current, the temperature sensor configured to sense a temperature of the NOx sensor and supply analog temperature sensor signals indicative of the sensed temperature; and
a NOx sensor control system coupled to the NOx sensor, the NOx sensor control system comprising:
a NOx sensor analog front-end adapted to receive the analog NOx sensor signals from the NOx sensor and configured to convert the analog NOx sensor signals to digital NOx sensor signals;
a temperature sensor analog front-end adapted to receive the analog temperature sensor signals from the temperature sensor and configured to convert the analog temperature sensor signals to digital temperature sensor signals;
a processing system, the processing system comprising:
a microcontroller coupled to receive the digital NOx sensor signals and the digital temperature sensor signals and configured, in response thereto, to (i) supply the digital NOx sensor signals to an external system and (ii) supply a resistance command,
a heater power source operable to supply a flow of current to a heater element; and
a digital potentiometer coupled to the heater power source and further coupled to receive the resistance command from the microcontroller, the digital potentiometer configured to control the flow of current from the heater power source to the heater element based on the resistance command.

6. The sensor system of claim 5, wherein the NOx sensor analog front-end comprises a multi-channel, multiplexed, analog-to-digital converter.

7. The sensor system of claim 5, further comprising an RS-232 transceiver coupled to receive the digital NOx sensor signals from the processing system.

8. The sensor system of claim 5, further comprising a controller area network (CAN) transceiver coupled to receive the digital NOx sensor signals from the processing system.

9. A vehicle comprising:
a vehicle body;
an internal combustion engine disposed within the vehicle body and configured, when operating, to generate and emit exhaust gases;
a NOx sensor assembly disposed within the vehicle and including a NOx sensor, a heater element, and a temperature sensor, the NOx sensor disposed to receive at least a portion of the exhaust gases from the engine and configured to sense NOx gases in the exhaust gases and supply analog NOx sensor signals indicative of the sensed NOx gases, the heater element coupled to at least selectively receive a flow of current, the temperature sensor configured to sense a temperature of the NOx sensor and supply analog temperature sensor signals indicative of the sensed temperature; and
a NOx sensor control system disposed within the vehicle body and coupled to the NOx sensor assembly, the NOx sensor control system comprising:
a NOx sensor analog front-end coupled to receive the analog NOx sensor signals from the NOx sensor and configured to convert the analog NOx sensor signals to digital NOx sensor signals;
a temperature sensor analog front-end coupled to receive the analog temperature sensor signals from the temperature sensor and configured to convert the analog temperature sensor signals to digital temperature sensor signals;
a processing system, the processing system comprising:
a microcontroller coupled to receive the digital NOx sensor signals and the digital temperature sensor signals and configured, in response thereto, to (i) supply the digital NOx sensor signals to an external system and (ii) supply a resistance command,
a heater power source operable to supply a flow of current to a heater element; and
a digital potentiometer coupled to the heater power source and further coupled to receive the resistance command from the microcontroller, the digital potentiometer configured to control the flow of current from the heater power source to the heater element based on the resistance command.

10. The sensor system of claim 9, wherein the NOx sensor analog front-end comprises a multi-channel, multiplexed, analog-to-digital converter.

11. The sensor system of claim 9, further comprising an RS-232 transceiver coupled to receive the digital NOx sensor signals from the processing system.

12. The sensor system of claim 9, further comprising a controller area network (CAN) transceiver coupled to receive the digital NOx sensor signals from the processing system and supply the digital NOx signals to the engine control module.

* * * * *